United States Patent

[11] 3,554,306

[72] Inventor Willard R. Wilburn
 Williamson, W. Va.
[21] Appl. No. 780,142
[22] Filed Nov. 29, 1968
[45] Patented Jan. 12, 1971
[73] Assignee Carmet Company
 Pittsburgh, Pa.
 a corporation of New Jersey

[54] POLYGONAL DRILL ROD ASSEMBLY
 2 Claims, 2 Drawing Figs.
[52] U.S. Cl. ................................................ 175/320,
 175/417
[51] Int. Cl. ................................................. E21b 17/00,
 E21c 15/00
[50] Field of Search ....................................... 175/195,
 320, 323, 417; 285/397, 370, 404; 282/2

[56] References Cited
UNITED STATES PATENTS

| 2,716,564 | 8/1955 | Lofquist | 175/417 |
| 3,178,210 | 4/1965 | Dickinson | 175/323 |
| 3,187,825 | 6/1965 | Bower, Jr. | 175/320 |
| 3,360,285 | 12/1967 | Huckshold | 287/2 |

FOREIGN PATENTS

| 1,006,952 | 10/1965 | Great Britain | 285/330 |

Primary Examiner—James A. Leppink
Attorneys—Richard A. Speer, Vincent G. Gioia and Howard R. Berkenstock ABSTRACT: A vacuum drill rod system of tubular members having polygonal inner and outer cross sections which interact with comparable outer and inner cross sections of cooperating elements when the rod system is connected to achieve concurrent rotation of the elements of the system.

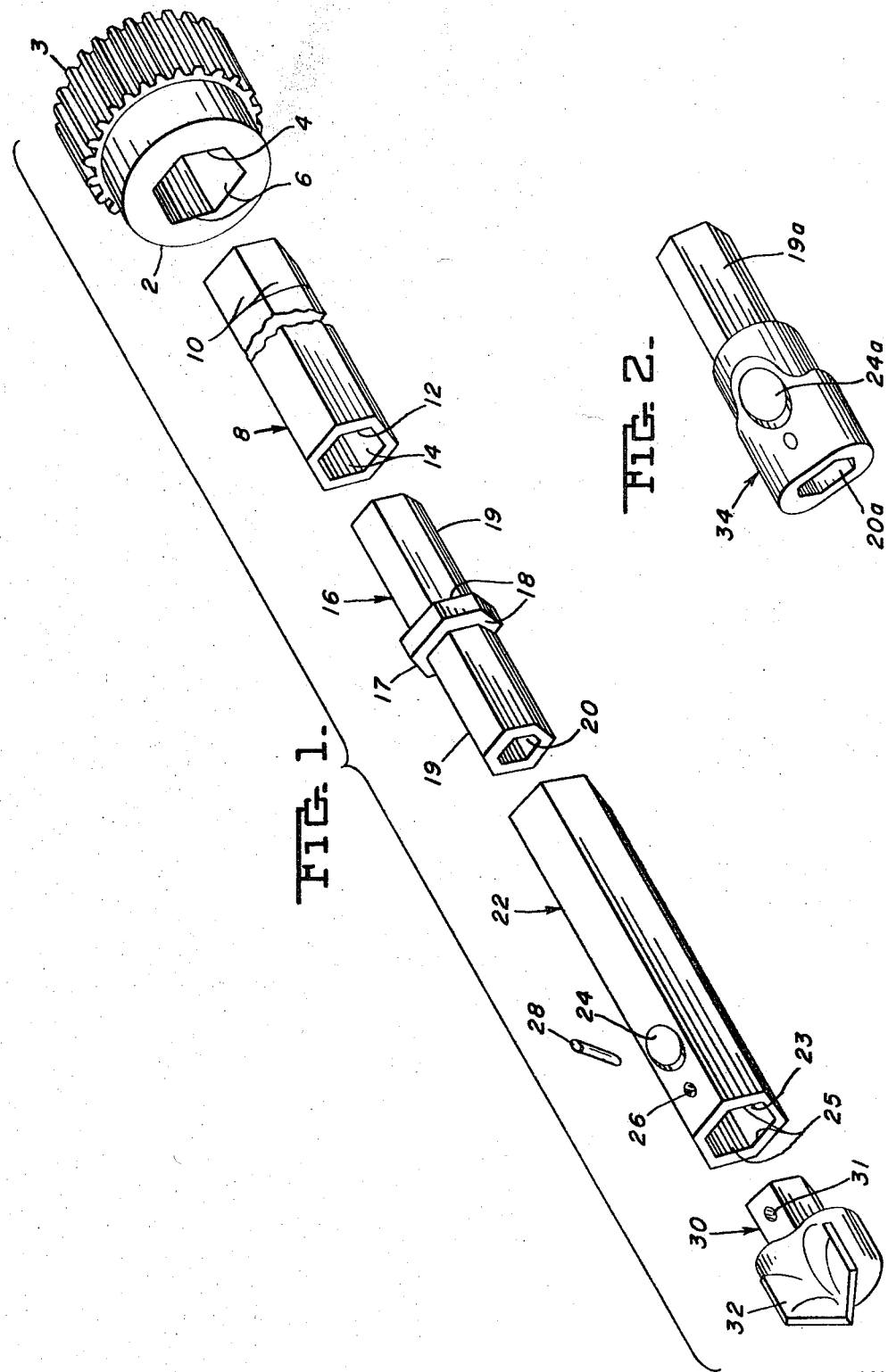

POLYGONAL DRILL ROD ASSEMBLY

BACKGROUND OF THE INVENTION

This invention relates to rods for transmission of torque from a driving member to a driven member. More specifically, this invention relates to an improved drill rod for earth drilling where the rod also provides an axial passage for a fluid to carry drill cuttings away from the cutting area. Conventional drilling rods for vacuum applications are tubular members which have circular cross sections and circular openings therethrough. Although these rods have enjoyed liberal use, constructions in accordance with the present invention are a considered improvement over the prior devices. Some of the disadvantages of conventional systems overcome by my invention include the elimination of elaborate chuck systems to engage the outer or inner diameters of the rod to achieve concurrent rotational motion of the rod and prime mover and elimination of elaborate couplings to connect two or more rods together for deeper drilling applications. Additional advantages of my system over conventional rods include an improved chamber for fluid flow through the interior of the rod by elimination of the need of fluid restricting chucks; increased flow of air around the outside of the rods enhancing cooling of the rods and bits thus permitting faster drilling and a more complete cleaning of the drill hole; additional strength per wall thickness of the polygonal rod over circular rods evidenced by less flexing and less twisting in the rods; and more rapid coupling through use of uncomplex couplers of cooperating polygonal cross sections.

SUMMARY OF THE INVENTION

The invention disclosed herein provides a rod system for connecting two separate and distinct members for concurrent rotation and the transmission of torque from the first member to the second member, which comprises at least one tubular member having an axial bore and inner and outer cross sections defining polygonal configurations wherein said inner and outer cross sections engage in a close fit, similarly shaped outer or inner cross sections in said first and second members.

It is also an object of my invention to provide a drill rod system which carries away drill cuttings through an axial bore from around the drill bit.

Another object of my invention is to provide a drill rod system which cleans the drill hole walls.

Still another object of my invention is to provide a drill rod system which connects and disconnects readily with a drill chuck and a drill bit.

A further object of my invention is to provide a drill rod system which eliminates need for complex couplings to achieve concurrent rotation of the elements.

BRIEF DESCRIPTION OF THE DRAWINGS

FIG. 1 is a pictorial representation of the drill rods and coupling members in accordance with one embodiment of the invention.

FIG. 2 is a pictorial representation of an example of an alternate method of providing ports venting the axial bore to the cutting area.

DESCRIPTION OF THE PREFERRED EMBODIMENT

Referring now to FIG. 1, numeral 2 indicates a drill chuck attachable at one end 3 to a rotary power source (not shown) with an axial hexagonal bore 4 defined by wall surfaces 6. Drill rod 8 having a hexagonal outside diameter formed by axial planar surfaces 10 also has an axial bore 12 with wall surfaces 14 defining a hexagonal opening. Rod 8 has an outside diameter slightly less than opening 4 but large enough to insure that surfaces 10 and 6 will interact and rotate when in juxtaposed relation and chuck 2 is rotated. The other end of rod 8 may receive coupling 16, having a collar 17 with a bearing surface 18, a hexagonal shank 19 and an axial bore 20. Shank 19 fits into and acts in close association with wall surfaces 14 in the same manner as surfaces 10 and 6. An end rod 22, having a hexagonal axial bore 23, may advantageously be provided with ports 24 communicating with the wall surfaces 25 defining the bore 23. End rod 22 is also provided with a hole 26 to accommodate a pin 28 which engages a bit shank 30 through hole 31 of drill bit 32 and may be used individually with chuck 2 or in combination with one or more rods 8 and couplings 16 to secure against axial displacement. Hexagonal drill rods with outside diameters of 1,000 inch and inside diameters of 0.755 inch have proved workable in the earth drilling industry. Dimension tolerances of ± 0.005 inch, by example, give a properly cooperating engagement between chuck 2 and rod 8.

FIG. 2 shows alternate means of joining the bit 32 to rod 22 by providing a coupler 34 having a hexagonal shaft 19a and a bore 20a but including ports 20a.

In operation, rod 8 is inserted into opening 4 of chuck 2 which is rotated by a drilling rod (not shown). Rod surfaces 10 bear on chuck opening wall surfaces 6 and transmit the rotational motion from chuck 2 to rod 8 with no relative movement between the two members. The axial bore 4 of chuck 2 may be connected to a vacuum pump (not shown) to apply a suction in bore 12 for removal of cuttings. Rotational motion is transmitted to end rod 22 through coupling 16 in which hexagonal shanks 19 engage the wall surface 14 of rods 8 and 22 in a manner similar to surfaces 10 and 6. Rods 8 and 22 slidably fit over shank 19 and bear on surfaces 18 thus securing the coupling to the jointure of the rods. The suction in bore 12 is transmitted to bore 23 through the bore 20 in coupling 16. A drill bit 32 may be fixed to the rod 22 by pin 28 extending through holes 26 and 31 securing hexagonal bit shank 30 into the rod bore 23 with the rotational motion being transmitted to bit 32 by the close association of hexagonal shank 30 with bore surfaces 25. It is to be noted here that the pin takes no shear load to provide concurrent rotation of the bit 32 and rod 22, serving merely to hold the bit in the rod against axial displacement. The suction in bore 23 is communicated to the bit area by ports 24 permitting cuttings to be drawn back through the bore by the vacuum equipment (not shown). The polygonal, e.g. hexagonal, configuration for the rods gives a stronger rod per wall thickness and allows use of a larger bore 12 and 23 in the rods by permitting the use of thinner walled rods. This improves the flow of the drilling waste and expedites drilling. Further, the hexagonal outside surfaces of the rods facilitates attachments to the drill chucks with close fits thereby eliminating the problem of pinning or more complicated coupling arrangements and providing an unobstructed passage from the rod bore 12 to the vacuum source further enhancing the flow of drill cuttings and speeding the drilling operation. It should also be noted that the polygonal rod generates air flow within the drill hole by the rotational motion of surfaces 10 providing both a cleaning action on the hole walls and a cooling air flow over the rods.

The alternative embodiment utilizing the coupler 34 shown in FIG. 2 provides a drill assembly of chuck 2, and rods 8 bit 32. The inclusion of coupler 34 provided with ports 24a substitutes for rod 22 with ports 24 which for some uses could detrimentally weaken the drill rod.

Although the example described herein utilizes a suction on one end of the bore system to draw cuttings away from the cutting area using air as the transport, it should be appreciated that the bore may be used to supply fluids. Thus, for example, the assembly may carry lubricants and liquid or gaseous coolants under pressure in a direction opposite that shown which transport cuttings away through the drilled hole. Additionally, the example shows a coupling member 16 engaging only the bore surfaces, but it is to be noted that some applications may permit a coupling which engages only the outer surfaces of the rods or both inner and outer surfaces.

While several embodiments of my invention have been shown and described, it will be apparent that other adaptations and modifications may be made without departing from the scope of the appended claims.

I claim:

1. Apparatus for vacuum drilling hard minerals in situ such as rock, coal and the like, comprising: rotary power means including a vacuum generating means; a drill chuck adapted for concurrent rotation and transmission of torque from said rotary power means, said chuck having an axial bore therethrough defining a polygonal cross section; at least one hollow elongated drill rod having longitudinal outer surfaces defining a polygonal cross section and an axial bore with axial wall surfaces defining a polygonal opening, said longitudinal outer surfaces and said axial wall surfaces being in parallel planar relation, said drill rod adapted to be closely engaged at one end thereof by said drill chuck within said chuck's polygonal bore, said drill rod's axial bore being in communication with said vacuum generating means; a drill bit having a polygonal shank adapted to be closely engaged by said drill rod so as to produce concurrent rotation and transmission of torque of said drill bit by said rotary power means, said drill rod and drill bit having port means therein communicating with said rod and bit's environment to enable said vacuum means to draw the fluid environment around said bit and leavings of drilling therethrough.

2. Apparatus of claim 1 including a plurality of said drill rods connected in longitudinal relationship for concurrent rotation and transmission of torque from said rotary power means to said drill bit wherein said rods are connected by an intermediate hollow connecting member having a cooperating polygonal configuration on either end adapted to closely engage said drill rods in a connecting relationship, said connecting member having gauging means to limit the engagement of said connecting member with said drill rods in the connecting relationship to an extent less than one-half the length of said rod.